W. A. E. NOBLE.
TURN TABLE.
APPLICATION FILED JUNE 7, 1913.
1,089,582.
Patented Mar. 10, 1914.
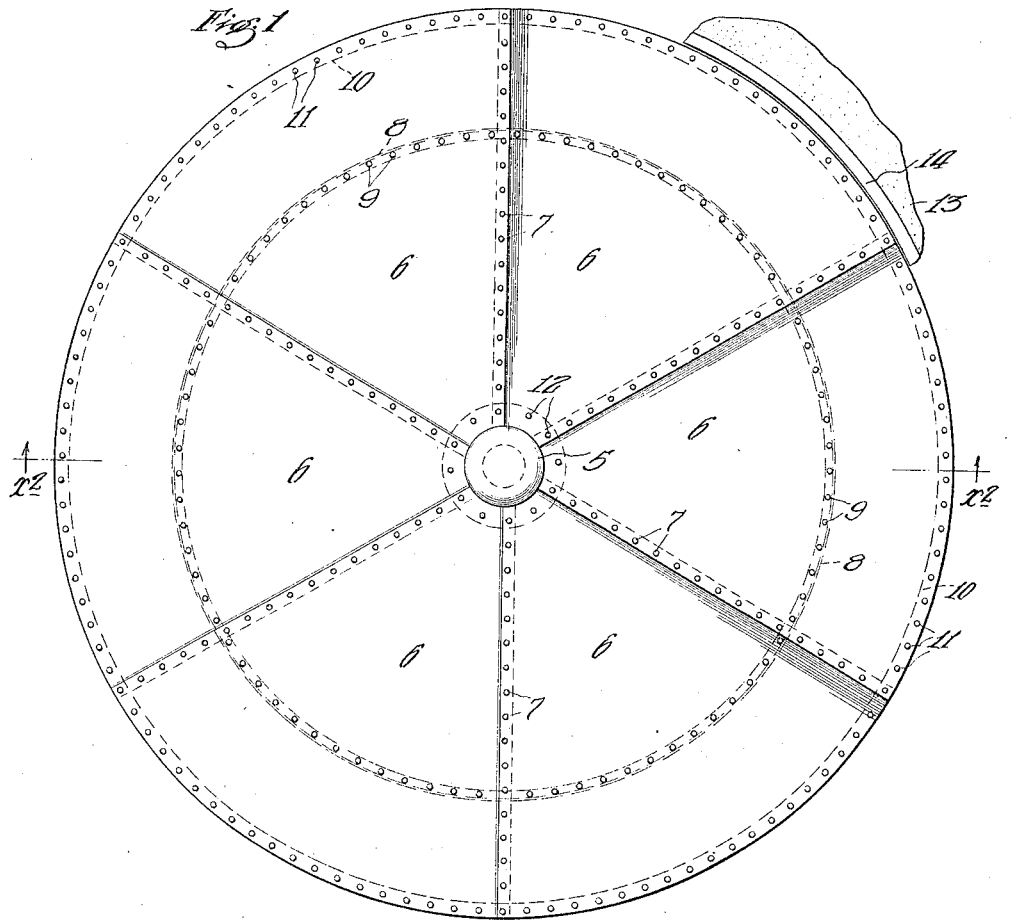
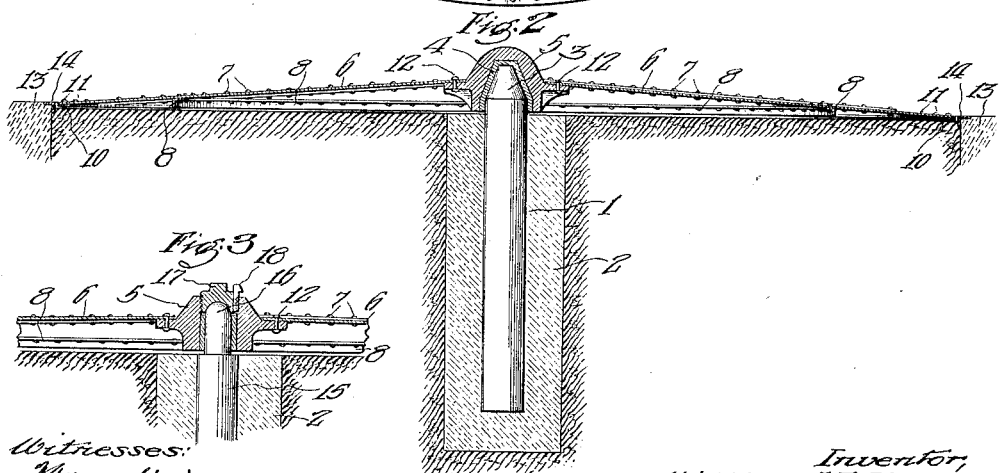
Witnesses:
J. M. Mansfield
Ford W. Harris
Inventor,
William A. E. Noble;
by Townsend & Graham
his attys.

UNITED STATES PATENT OFFICE.

WILLIAM A. E. NOBLE, OF LOS ANGELES, CALIFORNIA.

TURN-TABLE.

1,089,582. Specification of Letters Patent. Patented Mar. 10, 1914.

Application filed June 7, 1913. Serial No. 772,419.

*To all whom it may concern:*

Be it known that I, WILLIAM A. E. NOBLE, a citizen of the United States, residing at Los Angeles, in the county of Los Angeles and State of California, have invented a new and useful Turn-Table, of which the following is a specification.

My invention relates to turn tables and particularly to those used to turn an automobile or other similar vehicle.

The object of my invention is to produce a device of the class mentioned which will be easily operated and of a low cost, and in which it will be possible to dispense with the large pits commonly found necessary, with the attendant expense of excavating and concreting the same.

Other objects and advantages will be disclosed in the following specification.

Referring to the drawings, which are for illustrative purposes only: Figure 1 is a plan view of one form of turn table embodying my invention. Fig. 2 is a cross section on the line $x^2$—$x^2$ of Fig. 1. Fig. 3 is a partial cross section on the same line of an alternative form of pivot.

In the drawings, 1 is a central post set in concrete 2 and having a bearing pivot 3 at its upper end. This pivot 3 engages a babbitt 4 carried in a head 5 to which are attached sheet iron plates 6. These plates 6 are fastened together with rivets 7 and form a flat cone. Riveted to the under side of this cone is an angle 8 fastened by rivets 9. At the extreme edge of the cone is a flat strip 10 fastened to the cone by rivets 11. The plates 6 are secured to the head 5 by rivets 12. Around the edge of the pit may be placed a concrete edge 13 having an angle iron rim 14.

In the alternative construction shown in Fig. 3, I use a central post 15 having a semi-spherical end 16, this end being fitted to an adjusting bearing 17, which is threaded into a recess in the head 5. The bearing 17 and the head 5 have key-ways cut in same for the reception of a key 18. The construction of the remainder of the turn table where the alternative form shown in Fig. 3 is used is precisely the same as that shown in Fig. 2.

It will be understood that different forms of fastening may be employed in securing the various members of my invention together and that bolts may be used or the cone may be made in one piece and the joints welded if desired.

The method of operation of this turn table is as follows: An automobile or other vehicle, which it is desired to turn, is run upon the cone in an approximately central position, the bearing on the pivot 3 being sufficiently long to take up a considerable side stress due to any unbalancing of the load. The vehicle and turn table may then be swung around to any desired position. The turn table is made in a conical form principally for the purpose of obtaining additional mechanical strength over a flat plate. The cone with its stiffening members acts in a very similar manner to the tension spokes of a bicycle wheel. An additional advantage of the cone shape is that the vehicle may be washed when standing upon the turn table and the turn table will perfectly drain itself.

I claim as my invention:

1. A turn table comprising a central post, a conical platform supported solely thereby and turning freely thereon.

2. A turn table comprising a central post rigidly supported, and a conical platform supported solely by and turning on said post.

3. A turn table comprising a central stationary vertical post having a bearing on the upper end thereof, a head adapted to turn upon said bearing, a conical platform rigidly attached to said head and supported solely thereby.

4. A turn table comprising a central vertical stationary post having a bearing at the upper end thereof, a head, a bearing member mounted in said head and adapted to bear and turn upon said post, and a conical platform supported by said head.

5. A turn table comprising a central vertical stationary post having a bearing at the upper end thereof, a head, a bearing member adjustably secured in said head and adapted to bear and turn upon said post, and a conical platform secured to said head.

6. A turn table comprising a central stationary post, a conical platform and a bearing vertically adjustable with relation to said platform and resting upon said post, said platform being supported solely by said bearing.

7. A turn table comprising a central post and a conical platform supported thereon, the platform being constructed at a sufficient angle to render radial stiffening members unnecessary.

In testimony whereof, I have hereunto set my hand at Los Angeles, California, this 2nd day of June, 1913.

WILLIAM A. E. NOBLE.

In presence of—
FRED A. MANSFIELD,
FORD W. HARRIS.

Copies of this patent may be obtained for five cents each, by addressing the "Commissioner of Patents, Washington, D. C."